United States Patent
Suzuki et al.

(10) Patent No.: US 11,789,981 B2
(45) Date of Patent: Oct. 17, 2023

(54) DATA PROCESSING DEVICE, DATA PROCESSING METHOD, AND NON-TRANSITORY COMPUTER-READABLE RECORDING MEDIUM

(71) Applicant: Tokyo Electron Limited, Tokyo (JP)

(72) Inventors: Atsushi Suzuki, Sapporo (JP); Takahiko Kato, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 16/957,958

(22) PCT Filed: Dec. 25, 2018

(86) PCT No.: PCT/JP2018/047519
§ 371 (c)(1),
(2) Date: Jun. 25, 2020

(87) PCT Pub. No.: WO2019/131608
PCT Pub. Date: Jul. 4, 2019

(65) Prior Publication Data
US 2020/0372303 A1    Nov. 26, 2020

(30) Foreign Application Priority Data
Dec. 28, 2017  (JP) .................... 2017-253694

(51) Int. Cl.
*G06F 18/15*  (2023.01)
*G06F 16/28*  (2019.01)
(Continued)

(52) U.S. Cl.
CPC ............ *G06F 16/285* (2019.01); *G06F 18/15* (2023.01); *G06F 18/2163* (2023.01);
(Continued)

(58) Field of Classification Search
CPC .......... G06N 20/00; G05B 2219/45031; G05B 19/41885; G05B 19/4099; G06F 16/285;
(Continued)

(56) References Cited

U.S. PATENT DOCUMENTS

2009/0122979 A1*  5/2009  Lee .................... G06F 21/32
                                                              380/28
2015/0211122 A1   7/2015  Chang et al.
(Continued)

FOREIGN PATENT DOCUMENTS

| JP | 2009-152269 A | 7/2009 | |
| JP | 2009230807 A * | 10/2009 | |
| JP | 5210416 B2 * | 6/2013 | ......... H04N 13/0275 |

OTHER PUBLICATIONS

Search machine translation: Magnetic Recording Apparatus and Magnetic Recording Method of JP-2009-230807-A to Yutaka et al., Oct. 8, 2009 [retrieved Dec. 2, 2022], 14 pages. (Year: 2022).*

(Continued)

*Primary Examiner* — Matthew C Bella
*Assistant Examiner* — Dennis Rosario
(74) *Attorney, Agent, or Firm* — Nath, Goldberg & Meyer; Jerald L. Meyer; Tanya E. Harkins

(57) ABSTRACT

A highly versatile data processing is implemented on data collected in a manufacturing process. A data processing device includes: a calculation part configured to collect a plurality of data groups associated with a predetermined step of a process, and calculate effects in the predetermined step for each of the plurality of data groups; a dividing part configured to divide a feature space such that a distribution of each of the plurality of data groups associated with the predetermined step in the feature space is classified for each (Continued)

of the calculated effects; and an output part configured to output specific data that specifies respective regions of the divided feature space.

7 Claims, 14 Drawing Sheets

(51) Int. Cl.
  *G06V 30/242* (2022.01)
  *G06F 18/21* (2023.01)
  *G06F 18/231* (2023.01)
  *G06F 18/24* (2023.01)
  *G06F 119/18* (2020.01)
  *G06F 18/23* (2023.01)

(52) U.S. Cl.
  CPC ...... *G06F 18/231* (2023.01); *G06F 18/24765* (2023.01); *G06V 30/242* (2022.01); *G05B 2219/45031* (2013.01); *G06F 18/23* (2023.01); *G06F 2119/18* (2020.01)

(58) Field of Classification Search
  CPC ........ G06F 18/23; G06F 16/906; G06F 18/24; G06F 16/2365; G06F 2119/18; G06F 18/15; G06F 18/10; G06F 17/17; G06K 9/6267; G06K 9/6269; G06K 9/00536; G06K 9/6218; G06K 9/6219; G06K 9/6224; G06K 9/6261; G06T 7/11; G06T 3/4007; G06T 5/50; Y02P 90/02; G06V 20/698; G06V 10/811; G06V 10/809
  See application file for complete search history.

(56) References Cited

U.S. PATENT DOCUMENTS

| | | | |
|---|---|---|---|
| 2016/0096318 A1* | 4/2016 | Bickel | B33Y 30/00 425/150 |
| 2016/0357840 A1 | 12/2016 | Odashima et al. | |
| 2017/0177997 A1 | 6/2017 | Karlinsky et al. | |
| 2018/0246925 A1* | 8/2018 | Lee | G06F 16/2365 |
| 2018/0300631 A1* | 10/2018 | Roy | G06N 3/088 |
| 2018/0341248 A1* | 11/2018 | Mehr | G06N 3/08 |
| 2020/0410413 A1* | 12/2020 | Moki | G05B 19/41885 |

OTHER PUBLICATIONS

Search machine translation of JP 5210416 B2 to Shimeno, translated Jun. 1, 2023, 21 pages. (Year: 2023).*

* cited by examiner

FIG. 7

| Data group identifier | Setting data (R) | Output data (E) | Measurement data (Pl) | Experimental data (Pr) | Effect |
|---|---|---|---|---|---|
| | | | Process I STEP1 | | |
| Data 001 | ·Pressure_1<br>·Power_1<br>·Gas_1<br>·Temperature_1<br>... | ·Vpp_1<br>·Vdc_1<br>·OES_1<br>·Reflect_1<br>·Top DCS current_1<br>... | ·Plasma density_1<br>·Ion energy_1<br>·Ion flux_1<br>... | ·Etching rate_1<br>·Deposition rate_1<br>·XY position_1<br>·Film type_1<br>·Vertical/Lateral_1<br>... | Effect<1> |
| Data 002 | ·Pressure_2<br>·Power_2<br>·Gas_2<br>·Temperature_2<br>... | ·Vpp_2<br>·Vdc_2<br>·OES_2<br>·Reflect_2<br>·Top DCS current_2<br>... | ·Plasma density_2<br>·Ion energy_2<br>·Ion flux_2<br>... | ·Etching rate_2<br>·Deposition rate_2<br>·XY position_2<br>·Film type_2<br>·Vertical/Lateral_2<br>... | Effect<2> |
| ... | ... | ... | ... | ... | ... |

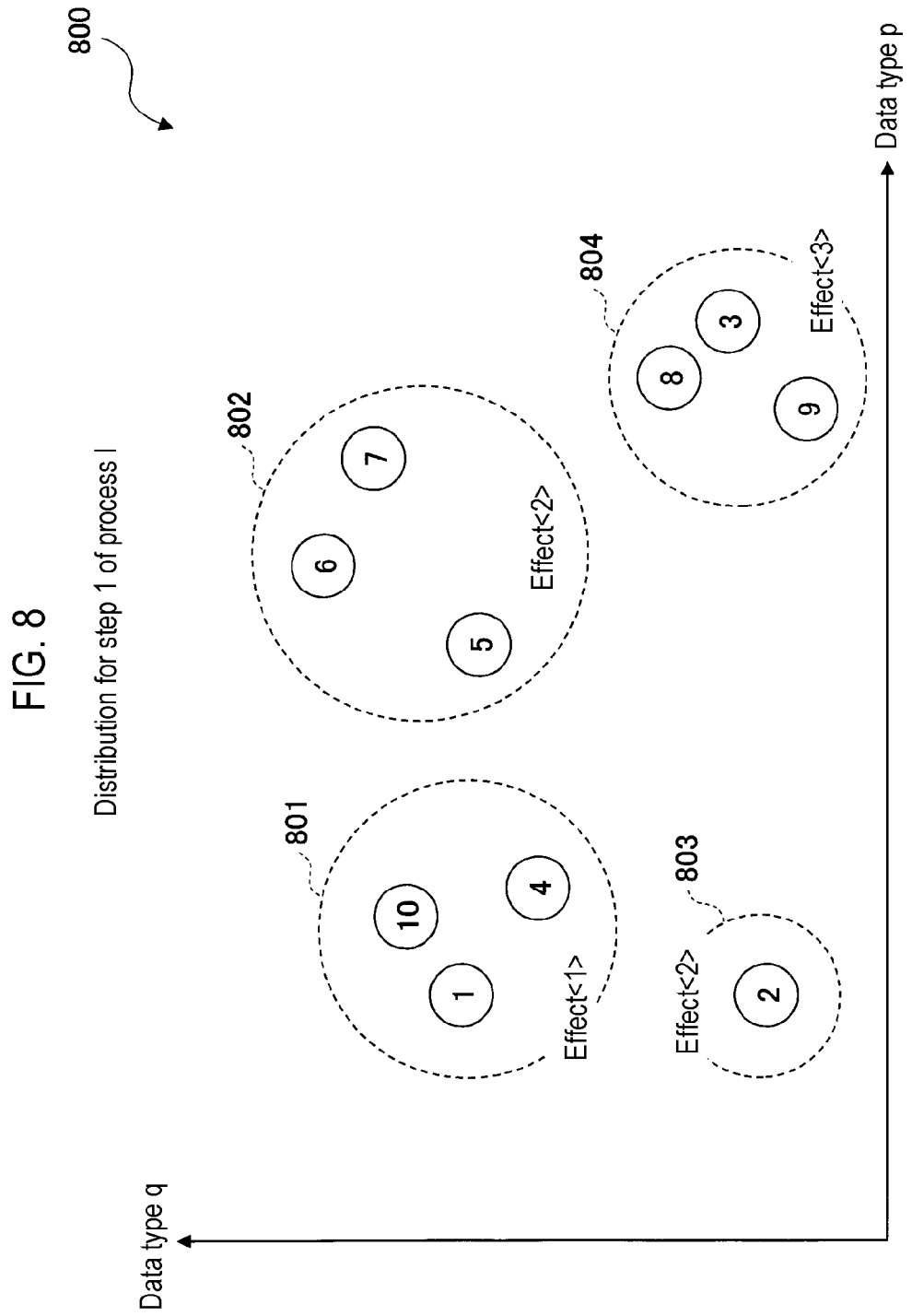

FIG. 9

| Classification | Process I STEP1 | | | |
|---|---|---|---|---|
| | Setting data (R) | Output data (E) | Measurement data (Pl) | Experimental data (Pr) |
| Group Gr1 (Effect <1>) | • Pressure_1~ Pressure_4<br>• Power_10~Power_1<br>• Gas_1~Gas_10<br>• Temperature_1~ Temperature_4<br>... | • Vpp_4~Vpp_1<br>• Vdc_1~Vdc_10<br>• OES_10~OES_1<br>• Reflect_4~ Reflect_10<br>• Top DCS current_1~ Top DCS current_4<br>... | • Plasma density_10~ Plasma density_4<br>• Ion energy_1~ Ion energy_4<br>• Ion flux_10~Ion flux_1<br>... | • Etching rate_10~ Etching rate_1<br>• Deposition rate_4~ Deposition rate_10<br>• XY position_10~ XY position_4<br>• Film type_1~ Film type_10<br>• Vertical/Lateral_1~ Vertical/Lateral_4<br>... |
| Group Gr2 (Effect <2>) | ... | ... | ... | ... |

DATA PROCESSING DEVICE, DATA PROCESSING METHOD, AND NON-TRANSITORY COMPUTER-READABLE RECORDING MEDIUM

CROSS-REFERENCE

This is a National Phase Application filed under 35 U.S.C. 371 as a national stage of PCT/JP2018/047519, filed Dec. 25, 2018, an application claiming the benefit of Japanese Application No. 2017-253694, filed Dec. 28, 2017, the content of each of which is hereby incorporated by reference in its entirety.

TECHNICAL FIELD

The present disclosure relates to a data processing device, a data processing method, and a non-transitory computer-readable recording medium.

BACKGROUND

Conventionally, there is known a data processing device that collects data used or measured in various manufacturing processes (e.g., a semiconductor manufacturing process) and performs various analyses. By analyzing the collected data using the data processing device, it is possible to perform modeling of a manufacturing process, execution of simulation processing, and the like, and to achieve optimization of the manufacturing process and improvement of product quality.

PRIOR ART DOCUMENTS

Patent Documents

Patent Document 1: Specification of U.S. Patent Application Publication No. 2017/0177997
Patent Document 2: Specification of U.S. Patent Application Publication No. 2015/0211122
Patent Document 3: Japanese Laid-Open Patent Publication No. 2009-152269

Meanwhile, modeling a manufacturing process requires time and cost. In order to improve simulation accuracy, it is necessary to build a model for each manufacturing facility individually, and even in the case of the same type of manufacturing processes, it is necessary to rebuild a model when manufacturing facilities are different. As described above, data processing performed by the conventional data processing device with respect to data collected in a manufacturing process is time-consuming and costly, and also lacks versatility.

In an aspect, there is provided a technology for implementing highly versatile data processing with respect to data collected in a manufacturing process.

SUMMARY

According to an aspect, a data processing device includes: a calculation part configured to collect a plurality of data groups associated with a predetermined step of a process, and calculate effects in the predetermined step for each of the plurality of data groups; a dividing part configured to divide a feature space such that a distribution of each of the plurality of data groups associated with the predetermined step in the feature space is classified for each of the calculated effects; and an output part configured to output specific data that specifies respective regions of the divided feature space.

It is possible to realize highly versatile data processing with respect to data collected in a manufacturing process.

BRIEF DESCRIPTION OF DRAWINGS

FIG. 7 is a view illustrating an exemplary data group stored in the data storage part.
FIG. 8 is a view illustrating a specific example of processing performed by a classification part.
FIG. 9 is a view illustrating an example of Proxel calculated by a Proxel calculation part.

DETAILED DESCRIPTION

Figure 1:
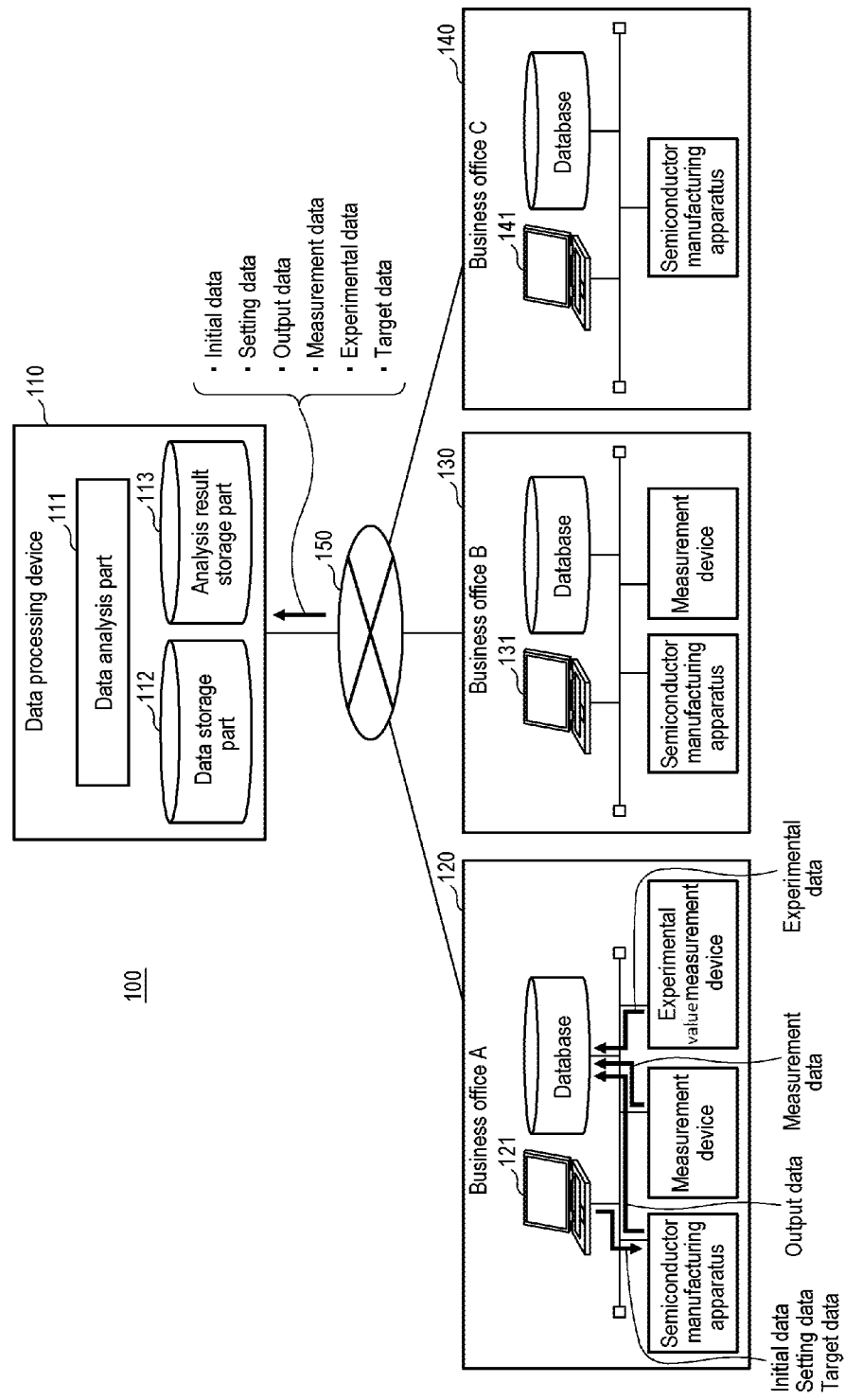
FIG. 1 is a view illustrating an exemplary overall configuration of a data processing system.

Hereinafter, various embodiments will be described with reference to the accompanying drawings. In the specification and drawings, components having substantially the same function and configuration will be denoted by the same reference numerals, and redundant description thereof will be omitted.

First Embodiment

<Overall Configuration of Data Processing System>

First, the overall configuration of a data processing system will be described. FIG. 1 is a view illustrating an exemplary overall configuration of the data processing system. As illustrated in FIG. 1, a data processing system 100 includes a data processing device 110 and terminals 121, 131, and 141 provided in respective business offices 120, 130, and 140 (office names: "Business Office A", "Business Office B", and "Business Office C"). The data processing device 110 and the terminals 121, 131, and 141 provided in the respective business offices 120, 130, and 140 are connected to each other in a communicable relationship with each other via a network 150.

A data analysis program is installed on the data processing device 110. When the data analysis program is executed, the data processing device 110 functions as a data analysis part 111.

The data analysis part 111 collects data groups (in the example of FIG. 1, initial data, setting data, output data, measurement data, experimental data, and target data) from the terminals 121, 131, and 141 in the respective business offices 120, 130, and 140 via the network 150. In addition, the data analysis part 111 stores the collected data groups in the data storage part 112. The method of collecting data groups is not limited thereto. For example, an administrator of the data processing device 110 may acquire a recording medium on which data groups are recorded from each of the business offices 120, 130, and 140, and may collect the data groups by reading the data groups from the recording medium.

The data analysis part 111 analyzes the data groups stored in the data storage part 112, and stores analysis result data in the analysis result storage part 113.

The business office 120 (business office name: "Business Office A") includes a semiconductor manufacturing apparatus that executes a semiconductor manufacturing process. In addition, the business office 120 includes a measurement device configured to measure the measurement data in the semiconductor manufacturing process, and an experimental value measurement device configured to measure the experimental data on a resultant product (a semiconductor or an intermediate product) manufactured in the semiconductor manufacturing process. In addition, the business office 120 includes the terminal 121 constituting the data processing system 100 and a database that stores the data groups.

The semiconductor manufacturing apparatus executes the semiconductor manufacturing process based on the initial data, the setting data, and the target data, which are inputted from the terminal 121. In addition, the semiconductor manufacturing apparatus stores the output data obtained by executing the semiconductor manufacturing process in the database in association with the initial data, the setting data, and the target data.

The measurement device measures the measurement data during the execution of the semiconductor manufacturing process by the semiconductor manufacturing apparatus, and stores the same in the database. The experimental value measurement device measures the experimental data on the resultant product (the semiconductor or the intermediate product) manufactured in the semiconductor manufacturing process, and stores the same in the database.

The terminal 121 inputs the initial data, the setting data, and the target data to be used when the semiconductor manufacturing apparatus executes the semiconductor manufacturing process, and sets these data in the semiconductor manufacturing apparatus. In addition, the terminal 121 transmits a data group (the initial data, the setting data, the output data, the measurement data, the experimental data, and the target data collected in the semiconductor manufacturing process) stored in the database to the data processing device 110.

A semiconductor manufacturing process similar to that of the business office 120 is executed in the business office 130 (business office name: "Business Office B") and the business office 140 (business office name: "Business Office C"). To do this, each of the business office 130 and the business office 140 includes the same devices as the business office 120. However, in the example of FIG. 1, the business office 130 does not include the experimental value measurement device. In addition, the business office 140 does not include the measurement device and the experimental value measurement device.

As described above, in the case in which the devices included in the respective business offices are different from each other, the information items of the data groups transmitted from the respective terminals 121, 131, 141 in the respective business offices 120, 130, and 140 to the data processing apparatus 110 are also different from each other. For example, the data group transmitted from the terminal 131 of the business office 130 does not include experimental data (or a portion thereof). In addition, for example, the data group transmitted from the terminal 141 of the business office 140 does not include measurement data and experimental data (or a portion thereof).

<Specific Example of the Data Group>

Figure 2:
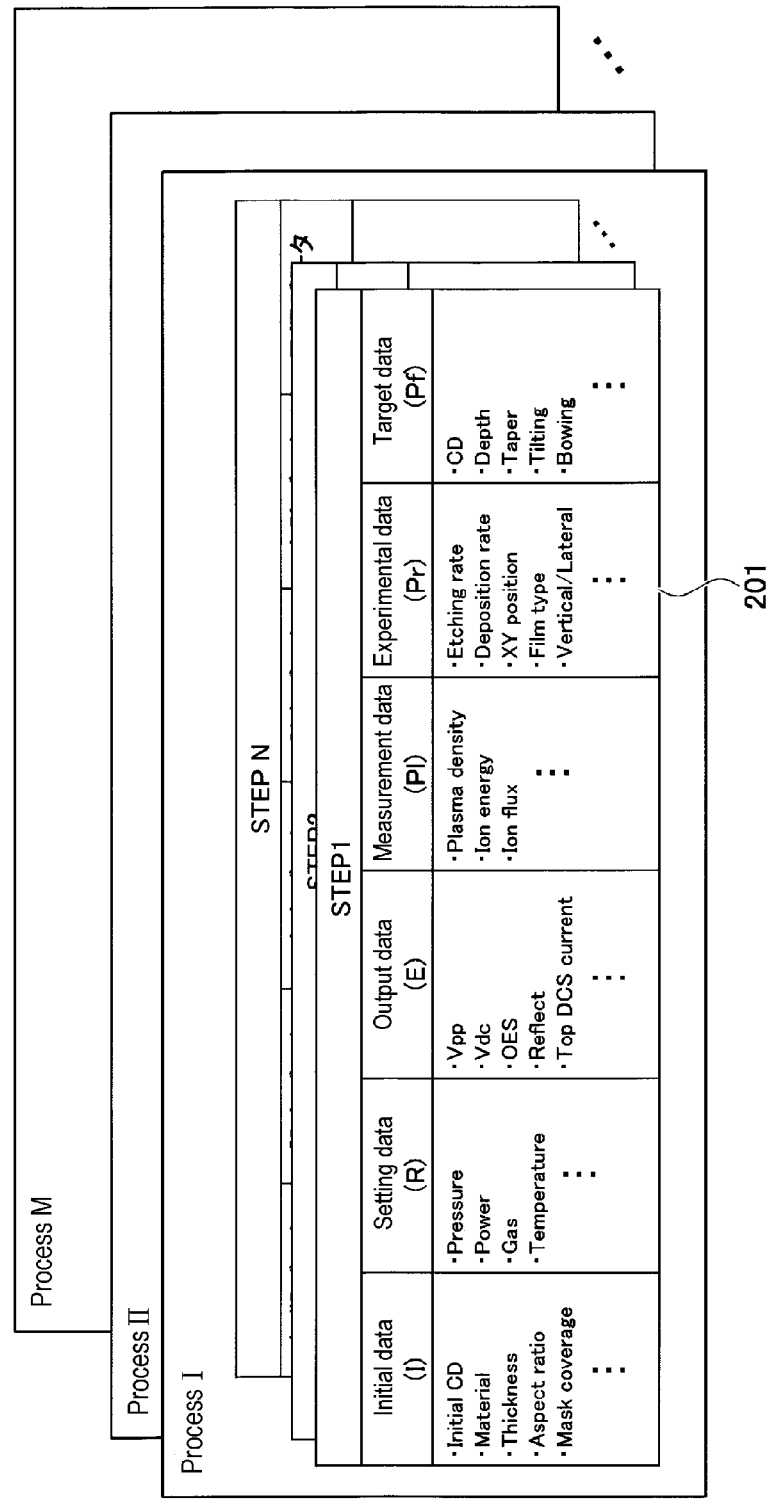
FIG. 2 is a view illustrating a specific example of a data group handled by each business office.

Next, the data groups handled by the respective business offices 120, 130 and 140 will be described. FIG. 2 is a view illustrating a specific example of the data group handled by each business office. Here, the data group handled by the business office 120 will be described.

As illustrated in FIG. 2, the semiconductor manufacturing apparatus in the business office 120 executes a plurality of semiconductor manufacturing processes (process names: "PROCESS I to PROCESS M"). Each of the semiconductor manufacturing processes has a plurality of steps (step names: "STEP 1 to STEP N"). The "step" used herein refers to a minimum processing unit that changes a state (e.g., an attribute of a processing target, a state of a semiconductor manufacturing apparatus, an atmosphere in the semiconductor manufacturing apparatus or the like) in a semiconductor manufacturing process. Accordingly, in the case where the state changes with time, in the present embodiment, the steps before the lapse of time and after the lapse of time are regarded as separate steps.

In FIG. 2, a data group 201 is a data group associated with:

- the semiconductor manufacturing process having the process name "PROCESS I", among the plurality of semiconductor manufacturing processes executed by the semiconductor manufacturing apparatus of the business office 120; and
- the step having the step name "STEP 1", among the plurality of steps included in the respective semiconductor manufacturing process.

As illustrated in FIG. 2, the data group 201 includes "Initial Data (I)", "Setting Data (R)", "Output Data (E)", and "Measurement Data (Pl)", "Experimental Data (Pr)", and "Target Data (Pf)" as information items.

The "Initial data (I)" includes the initial data inputted from the terminal 121 of the business office 120. In the case of the semiconductor manufacturing process, the initial data includes, for example, the following:

Initial CD (critical dimension)
Material
Thickness
Aspect ratio
Mask coverage

The "Setting Data (R)" includes setting data inputted from the terminal 121 of the business office 120 and set in the semiconductor manufacturing apparatus. The setting data set in the semiconductor manufacturing apparatus is data depending on the characteristics of the semiconductor manufacturing apparatus. In the case of the semiconductor manufacturing process, the setting data includes, for example, the following:

Pressure (internal pressure of chamber)
Power (power of high-frequency power supply)
Gas (gas flow rate)
Temperature (internal temperature of chamber or temperature on surface of substrate)

The "Output Data (E)" includes output data outputted from the semiconductor manufacturing apparatus of the business office 120 during the execution of the step having the step name "STEP 1" of the semiconductor manufacturing process having the process name "PROCESS I" by the semiconductor manufacturing apparatus of the business office 120. The output data outputted from the semiconductor manufacturing apparatus is data that depends on the characteristics of the semiconductor manufacturing apparatus. In the case of the semiconductor manufacturing process, the output data includes, for example, the following:

Vpp (potential difference)
Vdc (DC self-bias voltage)
OES (emission intensity by emission spectroscopy)
Reflect (reflected wave power)
Top DCS current (detected value by Doppler flow meter)

The "Measurement Data (PI)" includes measurement data measured by the measurement device of the business office 120 during the execution of the step having the step name "STEP 1" of the semiconductor manufacturing process having the process name "PROCESS I" by the semiconductor manufacturing apparatus of the business office 120. The measurement data measured by the measurement device is data that does not depend on the characteristics of the semiconductor manufacturing apparatus. In the case of the semiconductor manufacturing process, the measurement data includes, for example, the following:

Plasma density
Ion energy
Ion flux (ion flow rate)

The "Experimental Data (Pr)" includes experimental data obtained by measuring, by the experimental value measurement device, a resultant product generated by executing the step having the step name "STEP 1" of the semiconductor manufacturing process having the process name "PROCESS I" by the semiconductor manufacturing apparatus of the business office 120. The experimental data measured by the experimental value measurement device is data that does not depend on the characteristics of the semiconductor manufacturing apparatus. In the case of a semiconductor manufacturing process, the experimental data includes, for example, the following:

Etching rate
Deposition rate (film formation rate)
XY position (XY coordinates)
Film type (type of thin film)
Vertical/lateral (vertical/lateral classification)

The "Target Data (Pf)" includes target data inputted from the terminal 121 of the business office 120. The target data is an attribute that a resultant product generated by executing the entire semiconductor manufacturing process having the process name "PROCESS I" by the semiconductor manufacturing apparatus of the business office 120, is to reach. In the case of the semiconductor manufacturing process, the target data includes, for example, the following:

CD (critical dimension)
Depth
Taper (taper angle)
Tilting (tilt angle)
Bowing

The data group illustrated in FIG. 2 is an exemplary data group, and the types of data included in each information item are not limited to the illustrated ones. It is assumed that a data group includes different information items and different types of data for each office, each process, and each step.

<Outline of Analysis Result Data>

Figure 3:
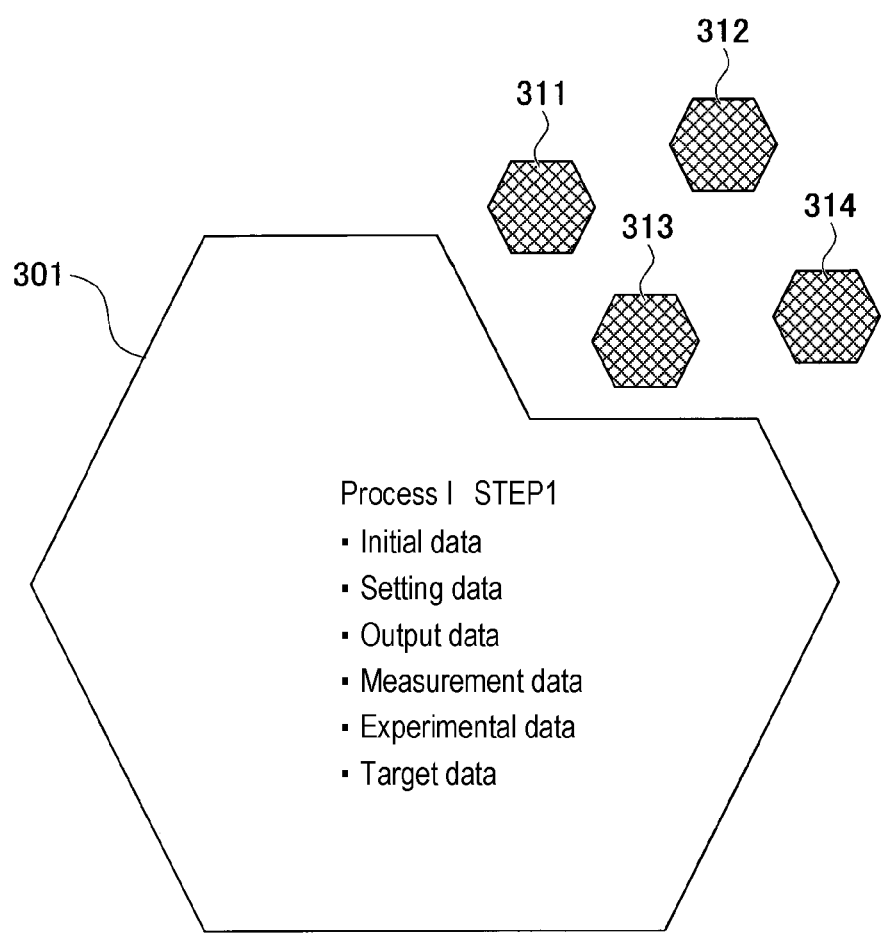
FIG. 3 is a view for explaining an outline of analysis result data stored in an analysis result storage part.

Next, an outline of analysis result data stored in the analysis result storage part 113, which is obtained by analyzing the data groups collected from each of the business offices 120, 130, and 140 by the data analysis part 111 of the data processing device 110, will be described. FIG. 3 is a view for explaining an outline of analysis result data stored in the analysis result storage part.

In FIG. 3, a data group 301 is a data group associated with a step having the step name "STEP 1" of the semiconductor manufacturing process having the process name "PROCESS I", and includes a plurality of data groups collected from each of the business offices 120, 130, and 140.

Specifically, the data group 301 includes data groups associated with the step having the step name "STEP 1" of the semiconductor manufacturing process having the process name "PROCESS I" of each of the business offices 130 and 140, in addition to the data group 201 collected from the business office 120.

The data processing device 110 analyzes a plurality of data groups corresponding to the same step of the same process, and groups data groups that are capable of obtaining the same effect. This is because in the semiconductor manufacturing apparatus, even when the same step of the same process is performed, different results may be obtained due to different data included in the data groups. Therefore, the range of each data included in the data groups allowed in order to obtain the same effect may be calculated by grouping data groups that are capable of obtaining the same effect and calculating specific data that specifies each group.

In FIG. 3, groups 311 to 314 are groups obtained by grouping data groups having the same effect in the data group 301. The specific data (each data range) specified by the groups in which the same effect is obtained in the same step of the same process may be regarded as a minimum data unit that gives a similar change in the "state" in the semiconductor manufacturing process. That is, the specific data (the range of each data) specified by the groups may be regarded as the smallest data unit in fine processing in the semiconductor manufacturing process.

As described above, the minimum data unit (process element) in the fine processing in the semiconductor manufacturing process is referred to as a "Proxel" in the first embodiment. This is the same name as the case where the minimum unit (picture element) of an image is called "Pixel" and the minimum unit of a three-dimensional structure (volume element) is called "Voxel".

In the first embodiment, the data analysis part 111 calculates the "Proxel" by analyzing the collected data groups, and stores the calculated "Proxel" in the analysis result storage part 113 as analysis result data.

<Hardware Configuration of Data Processing Device>

Figure 4:
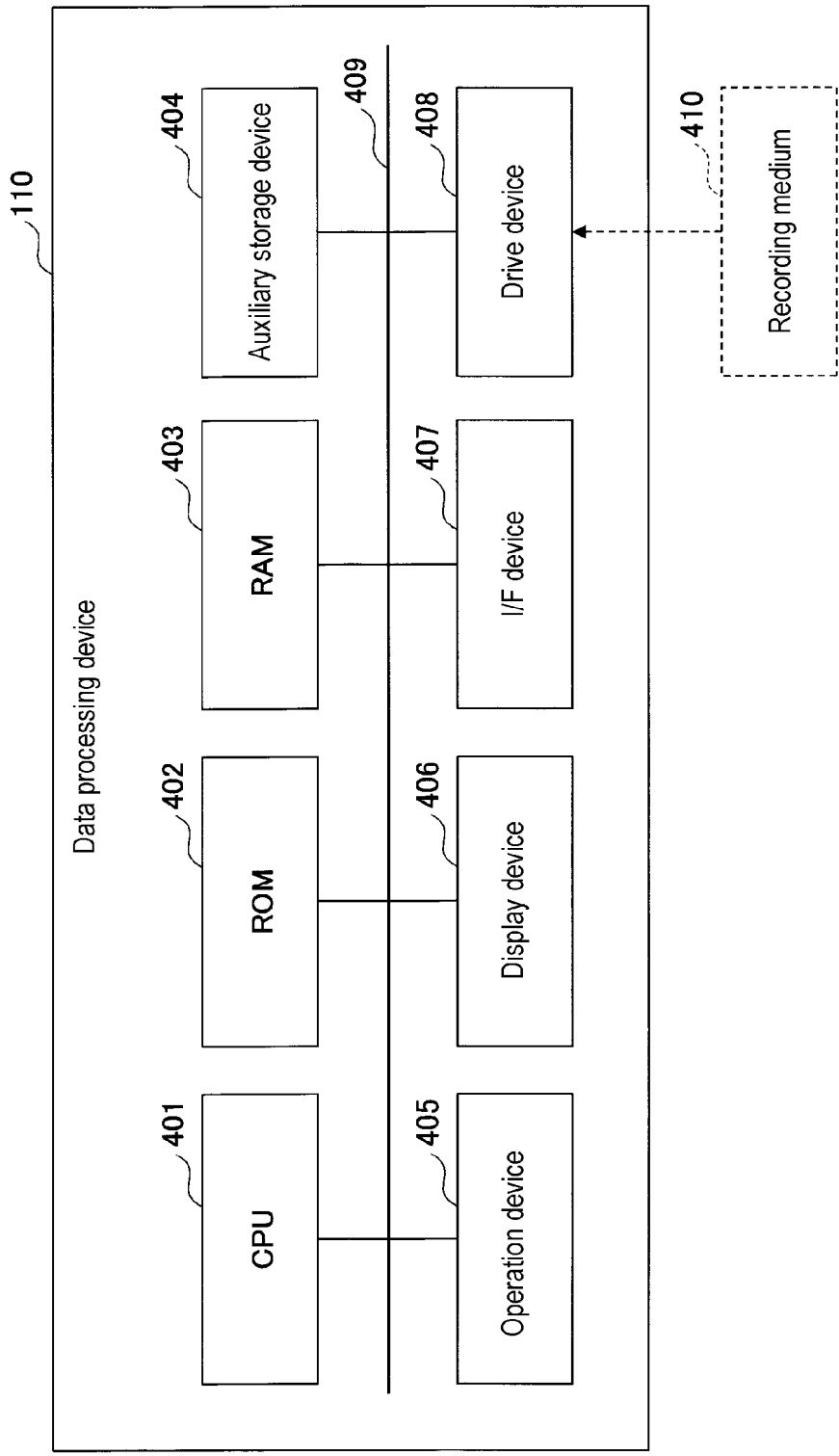
FIG. 4 is a view illustrating an exemplary hardware configuration of a data processing device.

Next, a hardware configuration of the data processing device 110 will be described. FIG. 4 is a diagram illustrating an example of the hardware configuration of the data processing device 110.

As illustrated in FIG. 4, the data processing device 110 includes a central processing unit (CPU) 401, a read only memory (ROM) 402, and a random access memory (RAM) 403. The CPU 401, the ROM 402, and the RAM 403 constitute a so-called computer. In addition, the data processing device 110 includes an auxiliary storage device 404, an operation device 405, a display device 406, an interface (I/F) device 407, and a drive device 408. In addition, respective hardware components of the data processing device 110 are connected to each other via a bus 409.

The CPU 401 executes various programs (e.g., a data analysis program) installed on the auxiliary storage device 404.

The ROM 402 is a nonvolatile memory, and functions as a main storage device. The ROM 402 stores, for example, various programs and data necessary for the CPU 401 to execute various programs installed on the auxiliary storage device 404. Specifically, the ROM 402 stores, for example, a boot program such as a basic input/output system (BIOS), an extensible firmware interface (EFI) and the like.

The RAM 403 is a volatile memory such as dynamic random-access memory (DRAM), static random-access memory (SRAM) or the like, and functions as a main storage device. The RAM 403 provides a work area to be expanded when various programs installed on the auxiliary storage device 404 are executed by the CPU 401.

The auxiliary storage device 404 stores various programs, data groups collected by executing the various programs by the CPU 401, and analysis result data calculated by executing the various programs by the CPU 401. The data storage part 112 and the analysis result storage part 113 are implemented in the auxiliary storage device 404.

The operation device 405 is an input device used when the administrator of the data processing device 110 inputs various instructions to the data processing device 110. The display device 406 displays internal information of the data processing device 110.

The I/F device 407 is a connection device that connects to the network 150 and communicates with the terminals 121, 131, and 141 of the respective business offices 120, 130, and 140.

The drive device 408 is a device for setting a recording medium 410. The recording medium 410 used herein includes a medium for optically, electrically, or magnetically recording information, such as a CD-ROM, a flexible disc, a magneto-optical disc or the like. In addition, the recording medium 410 may include, for example, a semiconductor memory that electrically records information, such as, ROM or flash memory.

In addition, the various programs to be installed in the auxiliary storage device 404 are installed, for example, by setting a distributed recording medium 410 into the drive device 408 and reading out, by the drive device 408, the various programs recorded in the recording medium 410. Alternatively, the various programs to be installed in the auxiliary storage device 404 may be installed by being downloaded via the network 150.

<Functional Configuration of Data Analysis Part of Data Processing Device>

Figure 5:
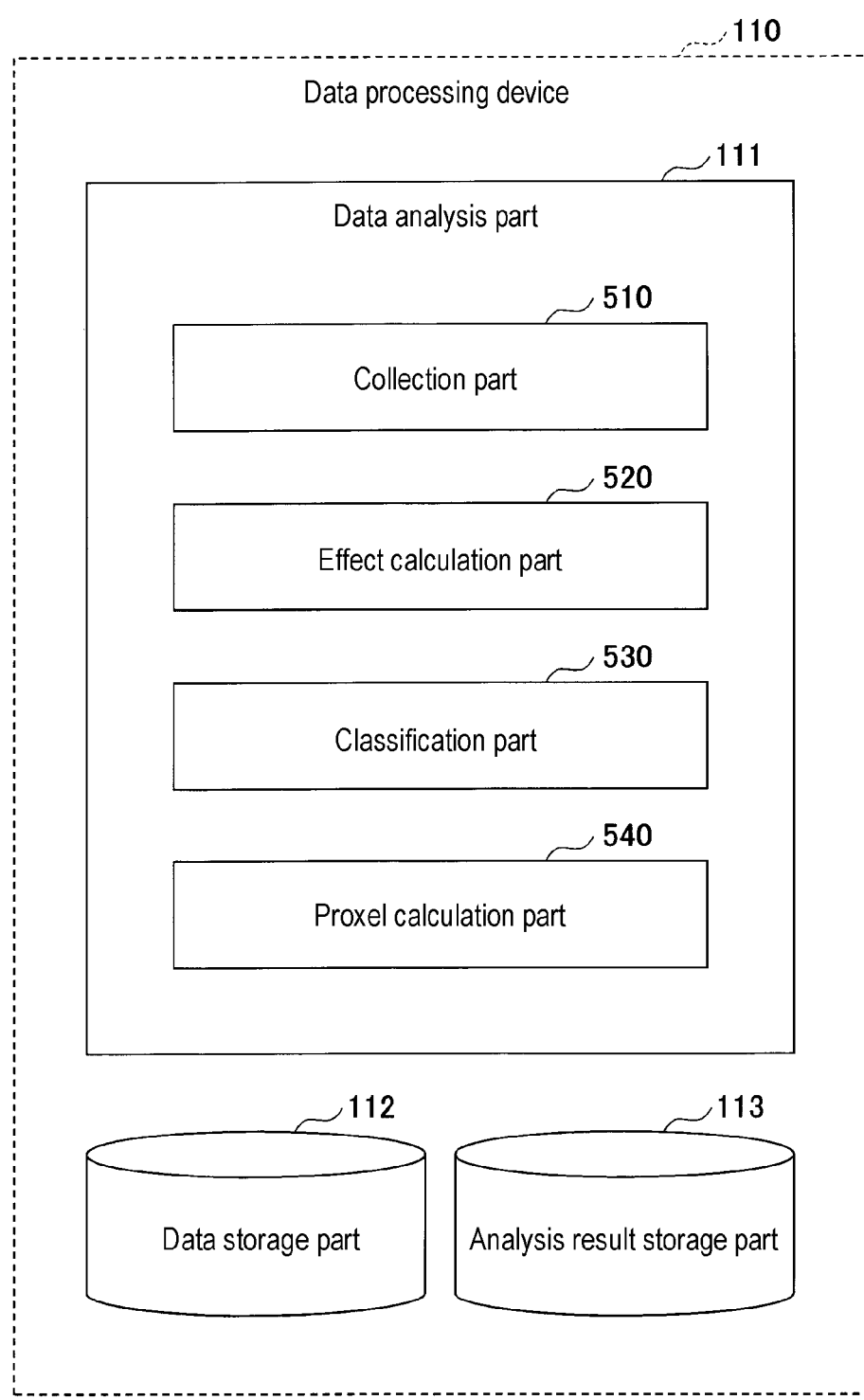
FIG. 5 is a view illustrating an exemplary functional configuration of a data analysis part.

Next, the functional configuration of the data analysis part 111 of the data processing device 110 will be described. FIG. 5 is a view illustrating an exemplary functional configuration of the data analysis part. As illustrated in FIG. 5, the data analysis part 111 includes a collection part 510, an effect calculation part 520, a classification part 530 (e.g., a classifier), and a Proxel calculation part 540 (e.g., a Proxel calculator).

The collection part 510 collects the data group 301 (e.g., the data group 201 or the like) from each of the terminals 121, 131, and 141 of the business offices 120, 130, and 140 via the network 150.

The effect calculation part 520 is an example of a calculation part, and calculates an effect for each collected data group. The effect calculation part 520 acquires, for each collected data group, data indicating a state before executing a corresponding step of a corresponding process and data indicating a state after executing the step of the respective process, and calculates a change in the state before and after the execution as an effect using these data. In addition, the effect calculation part 520 stores the calculated effect in the data storage part 112 as a data group together with the setting data, the output data, the measurement data, and the experimental data.

The classification part 530 is an example of a dividing part, and reads out each of a plurality of data groups stored in the data storage part 112 to analyze distribution in a feature space. When the type of data included in each data group is K, the classification part 530 analyzes the distribution of the data group in a K-dimensional feature space.

Specifically, the classification part 530 groups a plurality of data groups that have the same effect with respect to the plurality of read data groups. Further, the classification part 530 divides the K-dimensional feature space such that the data groups distributed in the feature space are classified into groups.

The Proxel calculation part 540 is an example of an output part. The Proxel calculation part 540 calculates the Proxel by calculating the range (specific data specified by a group) of each of the K types of data in each region of the K-dimensional feature space divided by the classification part 530, and stores the calculated Proxel in the analysis result storage part 113 as the analysis result data.

<Specific Example of Processing of Each Part of Data Analysis Part>

Next, among the respective parts (the collection part 510, the effect calculation part 520, the classification part 530, and the Proxel calculation part 540) of the data analysis part 111, a specific example of the processing of the effect calculation part 520, the classification part 530, and the Proxel calculation part 540 will be described.

(1) Specific Example of Processing of Effect Calculation Part

Figure 6:
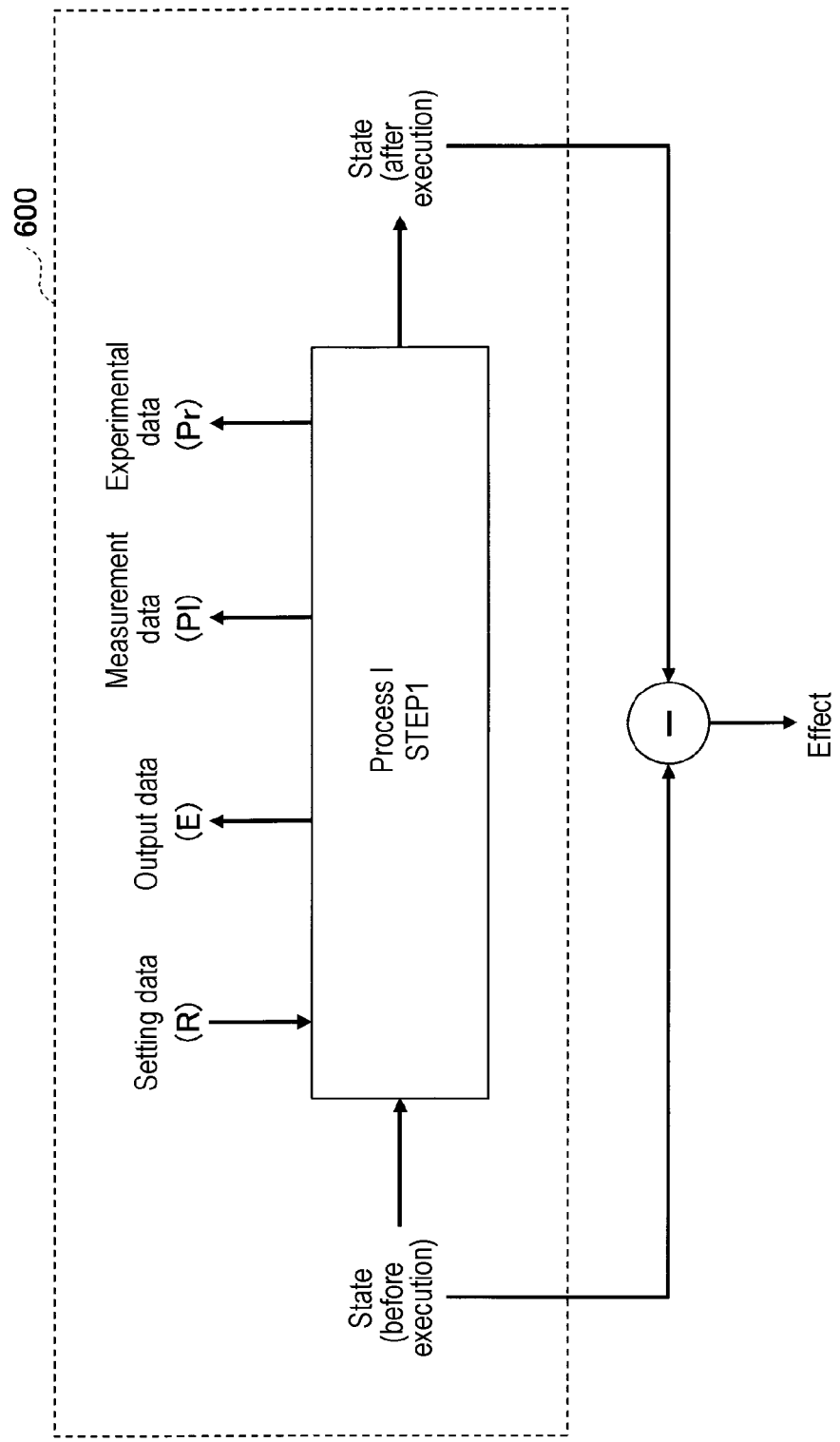
FIG. 6 is a view illustrating a specific example of processing performed by an effect calculation part.

First, a specific example of the processing of the effect calculation part 520 will be described. FIG. 6 is a diagram illustrating a specific example of the processing of the effect calculation part 520.

As illustrated in FIG. 6, a relationship between a predetermined step of a predetermined semiconductor manufacturing process (process name: "PROCESS I", step name: "STEP 1") and a data group may be schematically represented as represented by a dotted line 600.

That is, when the semiconductor manufacturing apparatus in which the setting data is set executes the predetermined step of the predetermined semiconductor manufacturing process, a state before the execution (any one of the attribute of the processing target, the state of the semiconductor manufacturing apparatus, and the internal atmosphere of the semiconductor manufacturing apparatus before the execution) is changed after the execution. Then, an execution situation of the semiconductor manufacturing process at this time may be specified by the output data, the measurement data, and the experimental data.

That is, under the execution situation specified by the setting data, the output data, the measurement data, and the experimental data, the effect in the predetermined step of the predetermined semiconductor manufacturing process may be represented by a difference between the following:

Data (first data) indicating state before execution, and
Data (second data) indicating state after execution Therefore, the effect calculation part 520 acquires the data indicating the state before execution and the data indicating the state after execution, corresponding to each data group for each step of each process. For example, a data group included in each of the output data, the measurement data, and the experimental data is divided into data changed by performing the predetermined step and data other than the data. The changed data is acquired as the data indicating the state before execution and as the data indicating the state after execution. In addition, the other data is acquired as data for specifying the execution situation.

Then, the effect calculation part 520 calculates the effect in each execution situation in the respective step of the respective process by calculating a difference between the two data (the data indicating the state before execution and the data indicating the state after execution). In addition, the effect calculation part 520 stores the calculated effect in the data storage part 112 as a data group in association with the setting data, the output data, the measurement data, and the experimental data.

FIG. 7 is a view illustrating an example of a data group stored in the data storage part, which is stored in the data storage part 112 by the effect calculation part 520 with respect to a step having the step name "STEP 1" of a semiconductor manufacturing process having the process name "PROCESS I".

As illustrated in FIG. 7, the data group stored in the data storage part 112 by the effect calculation part 520 includes "Data Group Identifier", "Setting Data (R)", "Output Data (E)", "Measurement Data (Pl)", "Experimental Data (Pr)", and "Effect" as information items.

The "Data Group Identifier" is an identifier for identifying each data group. In FIG. 7, a data group identifier "Data 001" is, for example, a data group including a data group collected from the business office 120 (business office name: "Business Office A") and an effect. In addition, a data group identifier "Data 002" is, for example, a data group including a data group collected from the business office 130 (business office name: "Business Office B") and an effect.

In the information items from the Setting Data (R) to the Experimental Data (Pr), data groups excluding the initial data (I) and the target data (Pf) among the data groups (see FIG. 2) collected from each of the business offices 120, 130, and 140 are stored.

In the information item of "Effect", the effects calculated by the effect calculation part 520 are stored. According to the example of FIG. 7, in the case of the step having the step name "STEP 1" of the semiconductor manufacturing process having the process name "PROCESS I", "Effect <1>" is obtained under the execution situation specified by the setting data or the like associated with the data group identifier "Data 001". Similarly, in the case of the step having the step name "STEP 1" of the semiconductor manufacturing process having the process name "PROCESS I" "Effect <2>" is obtained under the execution situation specified by the setting data or the like associated with the data group identifier "Data 002".

(2) Specific Example of Processing of Classification Part

Next, a specific example of the processing of the classification part 530 will be described. FIG. 8 is a view illustrating a specific example of the processing of a classification part.

As illustrated in FIG. 8, the classification part 530 reads out the plurality of data groups stored in the data storage part 112 for each process and for each step, and plots the read data groups in a feature space 800. In FIG. 8, each solid line circle mark in which a numerical value is shown indicates one of the plurality of read data groups, and numerical values shown in the solid line circle mark indicates a data group identifier of the respective data group.

In the example of FIG. 8, for the sake of simplification in description, the feature space 800 is illustrated as a two-dimensional configuration (that is, two types of data (data type p and data type q) included in a data group are plotted).

In FIG. 8, dotted line circle marks surrounding the outside of solid line circle marks indicate how data groups that achieve the same effect are grouped. That is, data groups identified by the data group identifiers described in the solid line circle marks included in each dotted line circle mark represent the data groups having the same effect in the steps having the step name "STEP1" of the semiconductor manufacturing process having the process name "PROCESS I".

For example, the dotted line circle mark 801 includes the data group identifiers "Data 001", "Data 004", and "Data 010". The solid line circle marks in which these data group identifiers are respectively described are distributed at positions close to each other in the feature space 800, but do not completely overlap each other. That is, the data groups identified by the respective data group identifiers are similar to each other, but do not completely coincide with each other.

Meanwhile, these data groups are data groups in all of which the Effect <1> is capable of being obtained in the step having the step name "STEP 1" of the semiconductor manufacturing process having the process name "PROCESS I". In other words, the plurality of data groups grouped by the dotted line circle mark 801 in the feature space 800 are data groups in which the Effect <1> is obtained even if STEP 1 of PROCESS I is executed under any of the data groups.

In FIG. 8, a dotted line circle mark 802 includes data group identifiers "Data 005", Data 006", and "Data 007", and a dotted line circle mark 803 includes a data group identifier "Data 002". Each data group included in the dotted line circle mark 802 and the data group included in the dotted line circle mark 803 are distributed at positions apart from each other.

Meanwhile, all the data groups identified by the data group identifiers described in respective solid line circle marks included in the dotted line circle mark 802 are data groups in which the Effect <2> is obtained when STEP 1 of PROCESS I is performed based on the respective data groups. Similarly, the data group identified by the data group identifier described in the solid line circle mark included in the dotted line circle mark 803 is a data group in which the Effect <2> is obtained when STEP 1 of PROCESS I is performed based on the data group.

Here, when the dotted circle mark 802 and the dotted circle mark 803 are grouped by one dotted line circle mark, the one dotted line circle mark overlaps another dotted circle mark 801. For this reason, even if the same effect is obtained, the classification part 530 groups the dotted circle marks separately (that is, when the feature space is divided, the classification part 530 performs grouping such that data groups associated with different effects are not mixed in the same region).

Then, the classification part 530 divides the feature space such that each data group distributed in the feature space is classified for each group. The classification part 530 divides the feature space by performing clustering processing with respect to each data group distributed in the K-dimensional feature space using "Effect" as an index.

(3) Specific Example of Processing of Proxel Calculation Part

Next, a specific example of the processing of the Proxel calculation part 540 will be described. As described above, the Proxel calculation part 540 calculates the Proxel by calculating the range of each data (specific data specified by a group) of each region of the feature space divided by the classification part 530. FIG. 9 is a view illustrating an example of Proxel calculated by the Proxel calculation part 540.

As illustrated in FIG. 9, the Proxel calculation part 540 calculates the range of each data in each region in the feature space by calculating the minimum value and the maximum value for each data included in each of the data groups grouped into the same group by the classification part 530.

The example of FIG. 9 illustrates that a data group that provides the same effect as the Effect <1> is grouped by the classification part 530 into a group having the group name "group Gr1". In addition, in the example of FIG. 9, among the data included in the data group grouped into the group having the group name "Group Gr1", "Pressure" of the setting data is indicated as follows:

Minimum value="Pressure_1"
Maximum value="Pressure_4"

The range of each data in the region of the feature space, in which the data group grouped into the group having the group name "Group Gr1" is distributed, may be indicated, specifically, by a dotted line 900. In addition, the range of each data represented by the dotted line 900 is nothing but the Proxel (specific data specified by the group 311) described in FIG. 3.

Figure 10:
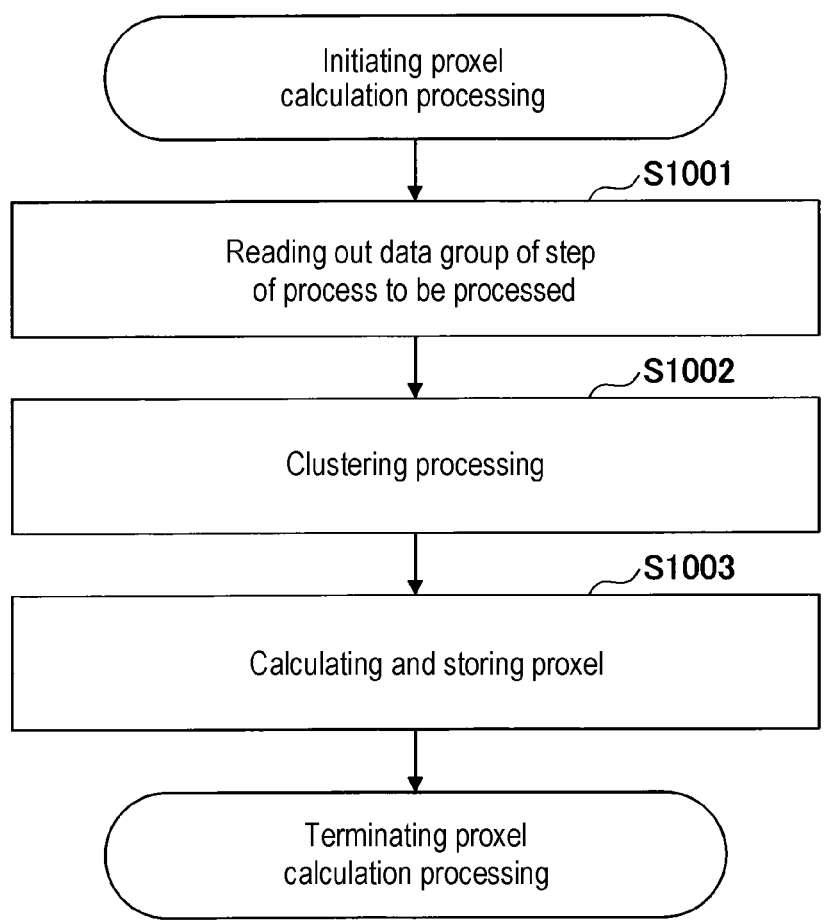
FIG. 10 is a first flowchart illustrating a flow of a Proxel calculation processing performed by the classification part and the Proxel calculation part.

FIG. 10 is a first flowchart illustrating the flow of Proxel calculation processing performed by the classification part and the Proxel calculation part.

In step S1001, the classification part 530 reads out, from the data storage part 112, a data group associated with a step of a process to be processed.

In step S1002, the classification part 530 divides the feature space by performing the clustering processing on each data group such that data groups having the same effect are classified into the same group.

In step S1003, the Proxel calculation part 540 calculates the Proxel by calculating the range of each data (specific data specifying each group) in each region of the feature space divided by the classification part 530. In addition, the Proxel calculation part 540 stores the calculated Proxel in the analysis result storage part 113 as analysis result data.

<Advantages of Proxel Calculation>

Next, advantages obtained when the Proxel calculation part 540 calculates the Proxel will be described.

(1) Improvement in Ease of Data Handling

One of the advantages obtained when the Proxel calculation part 540 calculates Proxel may be, for example, the improvement in ease of handling the plurality of data groups collected from the business offices 120, 130, and 140.

Figure 11:
FIG. 11 is a first view for explaining an advantage of calculating the Proxel.

FIG. 11 is a first view for explaining an advantage of calculating the Proxel. In FIG. 11, each of a plurality of data groups 1100 is an example of a data group collected from each of the business offices 120, 130, and 140. It is assumed that all of them are data groups that capable of providing the same effect. In FIG. 11, for the sake of simplification in description, five types of data are included in each data group.

Among the plurality of data groups 1100, some cells of "Ion Energy" in "Measurement Data" and "Etching Rate" in "Experimental Data" are blank because the respective business offices do not have a measurement device for measuring the respective data or an experimental data measurement device.

Meanwhile, in FIG. 11, a Proxel 1110 is an example of Proxel calculated by the Proxel calculation part 540 based on the plurality of data groups 1100.

By calculating the Proxel 1110, it becomes possible to handle a plurality of data groups that are capable of obtaining the same effect ("Effect <10>"), as one data group. By calculating the Proxel 1110 in this way, it is possible to interpolate an incomplete data group including a blank and handle the incomplete data group as one highly versatile data group including no blank. That is, by calculating the Proxel, it is possible to implement highly versatile data processing.

(2) Making Densities of Data Groups Uniform

One of the advantages obtained when the Proxel calculation part 540 calculates the Proxel is that the calculation is less susceptible to a variation in the density of the plurality of data groups collected from the business offices 120, 130, and 140. That is, it is possible to make the densities of data groups in the feature space uniform.

Figure 12:
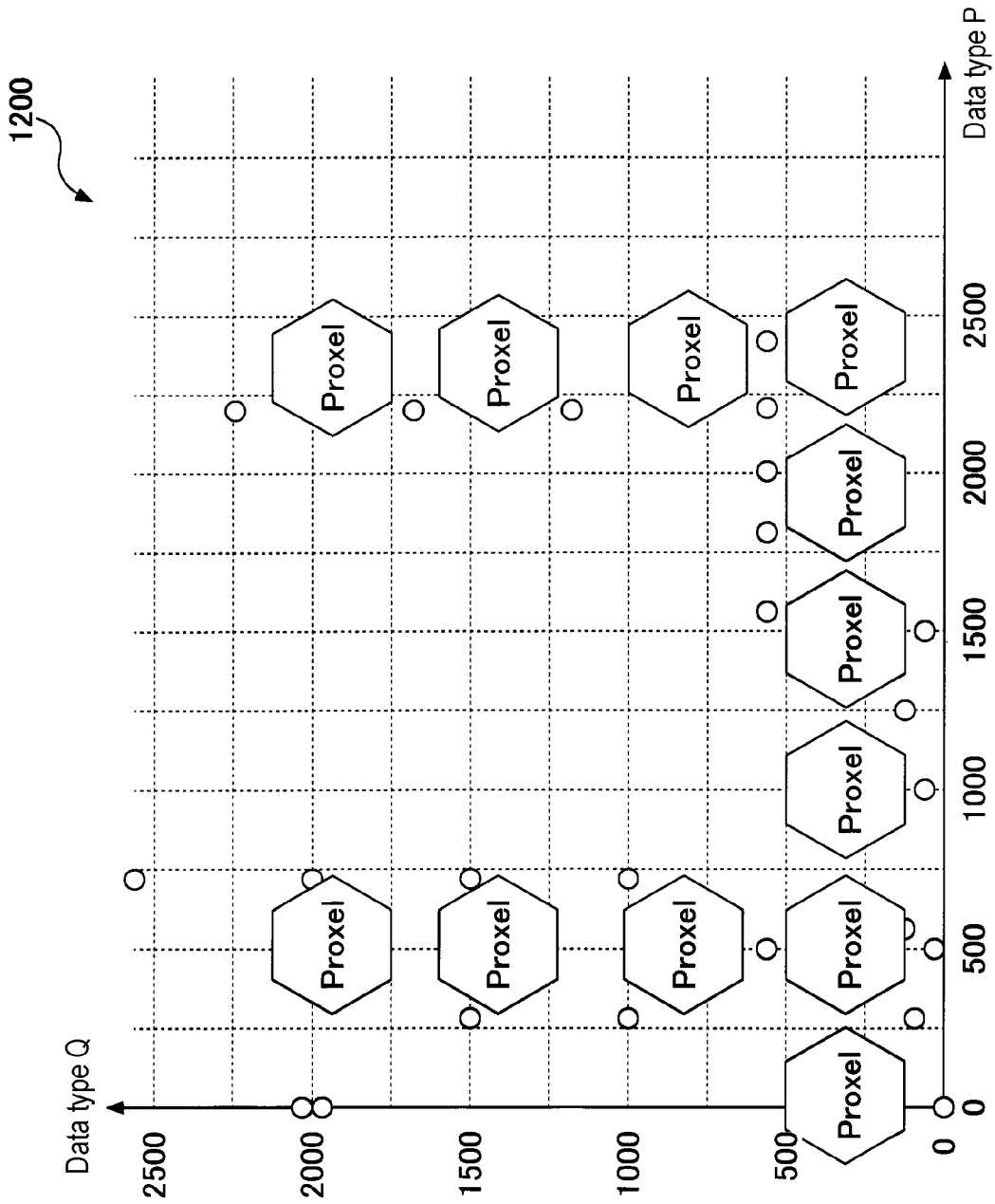
FIG. 12 is a second view for explaining an advantage of calculating the Proxel.

FIG. 12 is a second view for explaining an advantage of calculating a Proxel. In FIG. 12, the horizontal axis represents data type P (here, "HF Power"), and the vertical axis represents data type Q (here, "LF Power").

In a feature space 1200 illustrated in FIG. 12, white circles represent distributions of respective data groups, and regular hexagons represent Proxels. As illustrated in FIG. 12, distribution densities of the plurality of data groups collected from the business offices 120, 130, and 140 in the feature space 1200 vary. In contrast, it is possible to uniformly arrange Proxels in the feature space 1200.

As described above, by calculating a Proxel, it is possible to evenly handle data groups in various regions of the feature space 1200. Thus, for example, when mechanical learning is performed using a Proxel, it is possible to suppress the influence of variation in data groups. That is, by calculating the Proxel, it is possible to implement highly versatile data processing.

(3) Enabling Formation of Representative Model

One of the advantages obtained when the Proxel calculation part 540 calculate Proxels is that it is possible to form a representative model based on the Proxels and to estimate a resultant product of the respective step.

Figure 13:
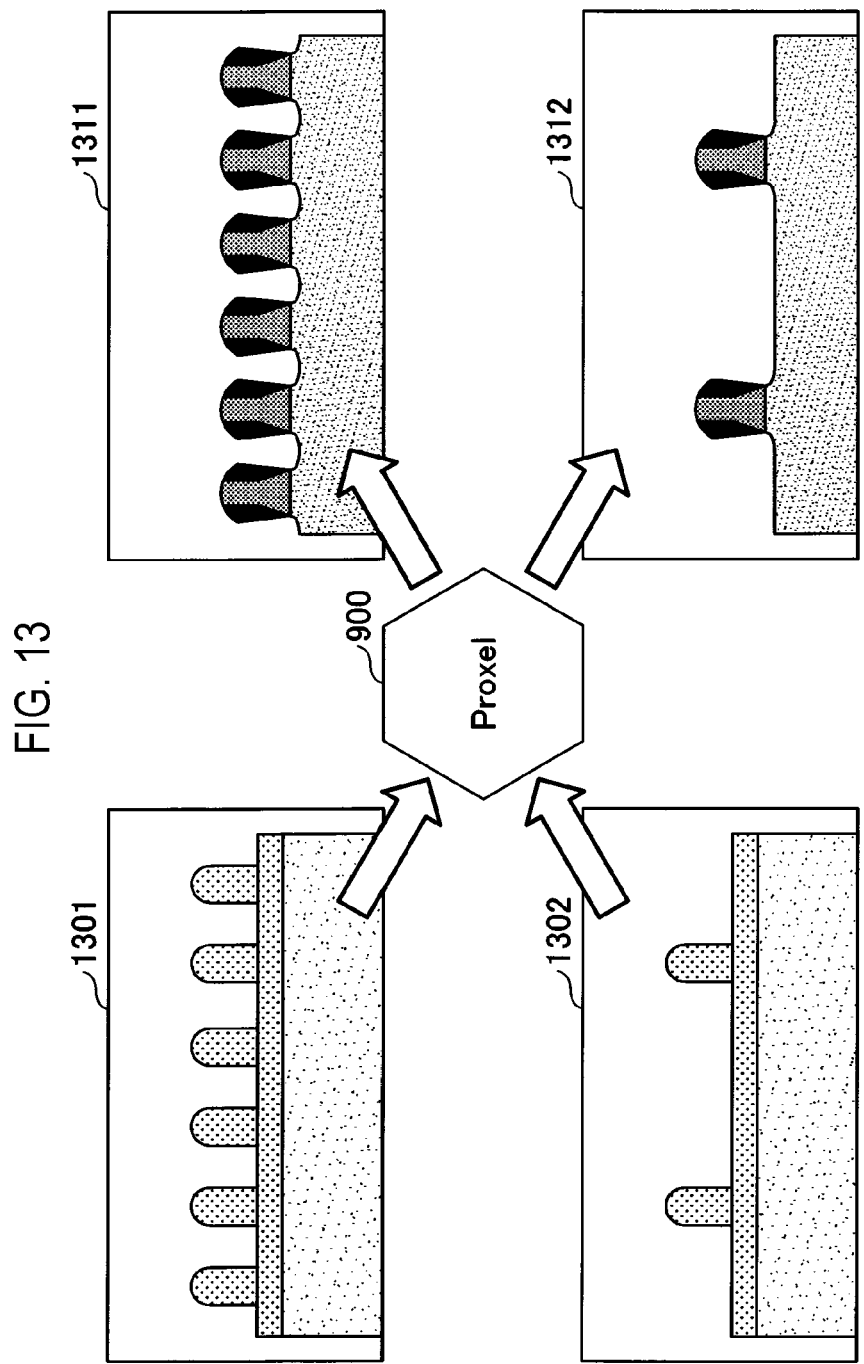
FIG. 13 is a third view illustrating an advantage of calculating the Proxel.

FIG. 13 is a third view for explaining an advantage of calculating Proxels. As illustrated in FIG. 13, since the effect of a respective step is associated with a Proxel (specific data specified by the group 311), it is possible to estimate a resultant product 1311 of the respective step when an initial data 1301 is input. Similarly, it is possible to estimate a resultant product 1312 of a respective step when an initial data 1302 is input.

By calculating a Proxel in this way, it is possible to estimate a resultant product without depending on the characteristics of the semiconductor manufacturing apparatus. That is, by calculating a Proxel, it is possible to implement highly versatile data processing.

SUMMARY

As is apparent from the above description, in the data processing device 110 according to the first embodiment,
   data groups are collected for each step of each process, and an effect is calculated for each collected data group,
   in the distribution of each data group in the feature space, the feature space is divided such that the data groups that are capable of obtaining the same effect are classified into the same group, and
   a Proxel is calculated by calculating the range of each data in each region of the divided feature space, and the calculated Proxel is stored as analysis result data.

As a result, according to the first embodiment, it is possible to obtain advantages of: improving the ease of handling the collected data groups; making the distribution densities of the collected data groups in the feature space uniform; and enabling formation of a model so as to estimate the resultant product of a respective step.

That is, according to the first embodiment, it is possible to implement highly versatile data processing for data groups collected in a manufacturing process.

Second Embodiment

In the first embodiment, it has been described that each data included in a data group is handled equally. However, a data group includes data having a high degree of contribution to the effect and data having a low degree of contribution to the effect. Therefore, in the second embodiment, the data is weighted depending on the degree of contribution to the effect, and then the clustering processing is executed.

In the first embodiment, each region is generated by dividing the feature space by the clustering processing, and the Proxel is calculated. In contrast, in the second embodiment, after each region is generated by dividing a feature space by the clustering processing, and, for a region having a low degree of contribution to the effect, a Proxel is calculated by integrating the respective region with another region.

Hereinafter, the second embodiment will be described with a focus on the differences from the first embodiment.
<Flow of Proxel Calculation Processing>

Figure 14:
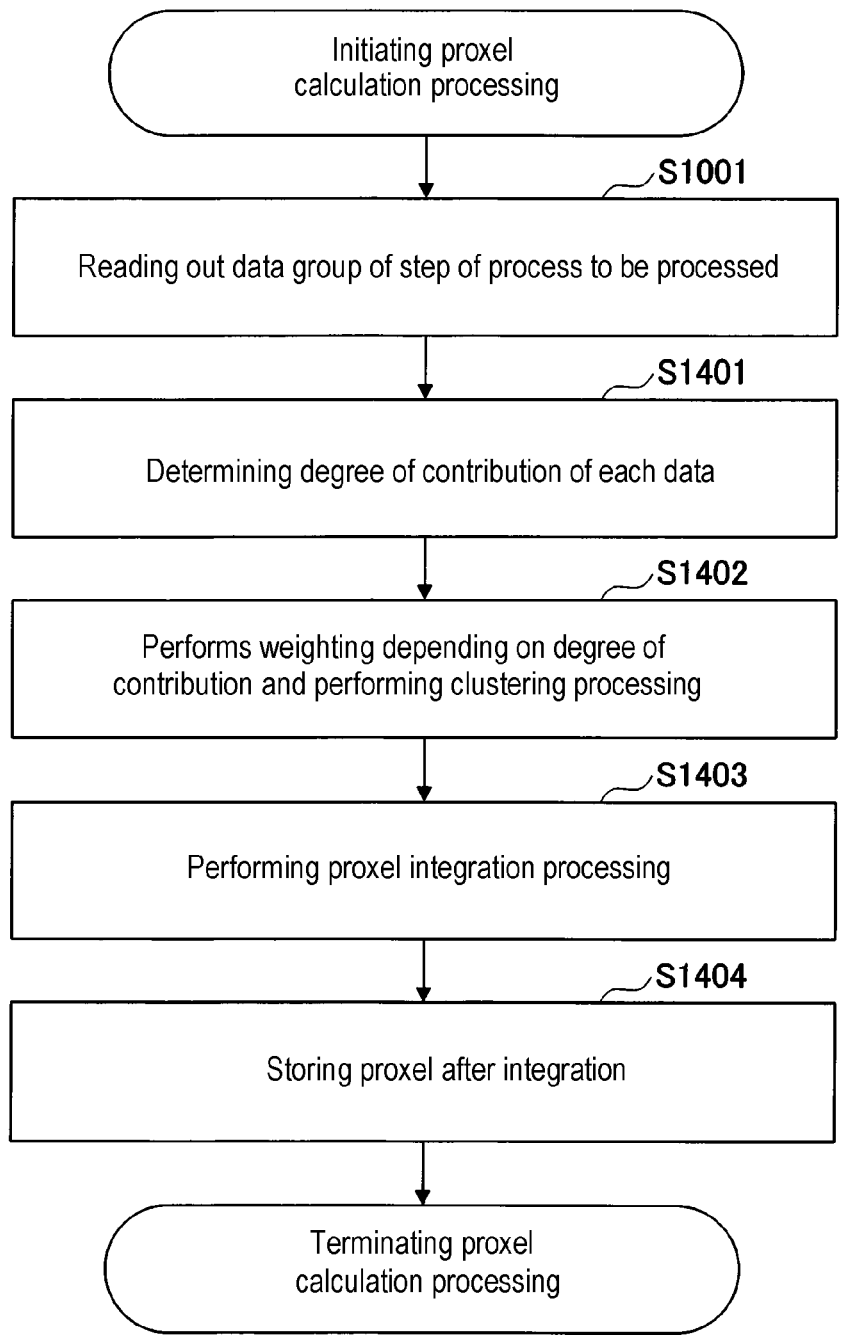
FIG. 14 is a second flowchart illustrating the flow of the Proxel calculation processing performed by the classification part and the Proxel calculation part.

FIG. 14 is a second flowchart illustrating the flow of Proxel calculation processing performed by the classification part and the Proxel calculation part. Differences from the Proxel calculation processing described with reference to FIG. 10 in the first embodiment are steps S1401 to S1404.

In step S1401, the classification part 530 determines the degree of contribution to the effect for each data included in data groups stored in the data storage part 112.

In step S1402, in order to ensure that data groups that are capable of obtaining the same effect are classified into the same group, the classification part 530 performs weighting on each data depending on the degree of contribution and then performs the clustering processing so as to divide a feature space. As a result, data having a high degree of contribution is finely divided in the feature space, and data having a low degree of contribution is roughly divided in the feature space.

In step S1403, the Proxel calculation part 540 integrates, among respective regions in the feature space divided by the classification part 530, a region having a low degree of contribution to the effect with another region.

In step S1404, the Proxel calculation part 540 calculates a Proxel by calculating the range of each data of each region after the integration, and stores the calculated Proxel in the analysis result storage part 113 as analysis result data.

SUMMARY

As is apparent from the above description, in the data processing device 110 according to the second embodiment, the following are added to the first embodiment:
when dividing the feature space, the degree of contribution to the effect of each data included in a data group is taken into account; and
among the respective regions of the divided feature space, a region having a low degree of contribution to the effect is integrated with another region.

Thus, with the data processing device 110 according to the second embodiment, it is possible to reduce the number of Proxels, and to calculate a Proxel depending on a degree of contribution.

Other Embodiments

In the above first and second embodiments, the Proxel was calculated by calculating the range of each data in each region of the divided feature space. However, the method of calculating a Proxel is not limited thereto.

For example, when respective regions of the divided feature space are significantly separated from each other in the feature space, the Proxel may be calculated by performing deformation processing on each region such that the regions are located adjacent to each other, and then calculating the range of each data of each region after the deformation. As a result, it is possible to reduce an empty region (region where a Proxel is not defined) in the feature space.

In the above first and second embodiments, there has been described a configuration in which proxels are calculated by calculating the range of each data of each region of the divided feature space, and the Proxels are stored in the analysis result storage part 113 as the analysis result data. However, the analysis result data stored in the analysis result storage part 113 is not limited to the Proxels. For example, representative data (specific data specifying each group) representing each region of a divided feature space may be stored as the analysis result data.

In the above first and second embodiments, it has been described that a data analysis program is installed on the data processing device 110, and the data analysis part 111 is implemented in the data processing device 110. However, the data analysis program may be installed, for example, on the terminals 121, 131, and 141 of the respective business offices 120, 130, and 140, and the data analysis part 111 may be implemented in the terminals 121, 131, and 141 of the respective business offices 120, 130, and 140.

In the above first and second embodiments, the case has been described where the Proxels are calculated for the data groups collected in the semiconductor manufacturing process. However, the data groups for calculating the Proxels are not limited to the data groups collected in the semiconductor manufacturing process. Even in a manufacturing process other than the semiconductor manufacturing process, for example, in a manufacturing process using a plasma-based apparatus, setting data is generally complicated. For this reason, it is possible to obtain the above-described advantages even when Proxels are calculated for data groups collected in the manufacturing process using the plasma-based apparatus.

The present disclosure is not limited to the configurations illustrated herein, such as a combination of a configuration or the like illustrated in the above embodiments with other elements. With respect to this point, a change can be made within a scope without deviating from the gist of the present disclosure, and the scope can be appropriately determined according to an application form thereof.

This application claims the priority from Japanese Patent Application No. 2017-253694 filed on Dec. 28, 2017, the disclosure of which is incorporated herein in its entirety by reference.

EXPLANATION OF REFERENCE NUMERALS

100: data processing system
110: data processing device

111: data analysis part
201: data group
311 to 314: group
510: collection part
520: effect calculation part
530: classification part
540: Proxel calculation part
800: feature space
900: Proxel

What is claimed is:

1. A data processing device comprising:
an effect calculator configured to collect a plurality of data groups associated with a predetermined step of a process, and calculate effects in the predetermined step for each of the plurality of data groups;
a classifier configured to divide a feature space such that a distribution of each of the plurality of data groups associated with the predetermined step in the feature space is classified for each of the calculated effects; and
a Proxel calculator configured to calculate a Proxel that specifies respective regions of the divided feature space,
wherein the Proxel is a minimum data unit in a fine processing in a semiconductor manufacturing process,
wherein the classifier divides the feature space by performing a clustering processing on each of the plurality of data groups such that data groups having a same effect are classified into a same data group,
wherein the Proxel calculator is configured to calculate the Proxel by calculating a minimum value and a maximum value for each data included in each of the data groups classified into the same data group by the classifier,
wherein the Proxel calculator is configured to handle each of the data groups classified into the same data group by the classifier as one data group by calculating the Proxel, and
wherein the Proxel calculator is configured to interpolate an incomplete data group including a blank and handle the incomplete data group as one versatile data group including no blank by calculating the Proxel.

2. The data processing device of claim 1, wherein the effect calculator calculates the effect for each of the plurality of data groups based on a difference between a first data indicating a state before the predetermined step of the process is executed and a second data indicating a state after the predetermined step of the process is executed.

3. The data processing device of claim 1, wherein the classifier weights each data included in the plurality of data groups based on a degree of contribution to the effect of each data included in the plurality of data groups, and divides the feature space using a data group including each weighted data.

4. The data processing device of claim 1, wherein the classifier deforms the respective regions of the divided feature space such that the respective regions do not overlap each other.

5. The data processing device of claim 1,
wherein the predetermined step changes a state in the semiconductor manufacturing process as a minimum processing unit, and
the state includes at least an attribute of an object to be processed in the semiconductor manufacturing process.

6. A data processing method comprising:
collecting a plurality of data groups associated with a predetermined step of a process, and calculating effects in the predetermined step for each of the plurality of data groups;
dividing a feature space such that a distribution of each of the plurality of data groups associated with the predetermined step in the feature space is classified for each of the calculated effects; and
calculating a Proxel that specifies each region of the divided feature space,
wherein the Proxel is a minimum data unit in a fine processing in a semiconductor manufacturing process,
wherein the feature space is divided by performing a clustering processing on each of the plurality of data groups such that data groups having a same effect are classified into a same data group,
wherein the Proxel is calculated by calculating a minimum value and a maximum value for each data included in each of the data groups classified into the same data group,
wherein the calculating the Proxel includes handling each of the data groups classified into the same data group as one data group by calculating the Proxel, and
wherein the calculating the Proxel includes interpolating an incomplete data group including a blank and handling the incomplete data group as one versatile data group including no blank by calculating the Proxel.

7. A non-transitory computer-readable recording medium storing a program for causing a computer to execute:
collecting a plurality of data groups associated with a predetermined step of a process, and calculating effects in the predetermined step for each of the plurality of data groups;
dividing a feature space such that a distribution of each of the plurality of data groups associated with the predetermined step in the feature space is classified for each of the calculated effects; and
calculating a Proxel that specifies each region of the divided feature space,
wherein the Proxel is a minimum data unit in a fine processing in a semiconductor manufacturing process,
wherein the feature space is divided by performing a clustering processing on each of the plurality of data groups such that data groups having a same effect are classified into a same data group,
wherein the Proxel is calculated by calculating a minimum value and a maximum value for each data included in each of the data groups classified into the same data group,
wherein the calculating the Proxel includes handling each of the data groups classified into the same data group as one data group by calculating the Proxel, and
wherein the calculating the Proxel includes interpolating an incomplete data group including a blank and handling the incomplete data group as one versatile data group including no blank by calculating the Proxel.

* * * * *